United States Patent
Lee et al.

(10) Patent No.: US 9,189,127 B2
(45) Date of Patent: Nov. 17, 2015

(54) APPARATUS AND METHOD OF USER-BASED MOBILE TERMINAL DISPLAY CONTROL USING GRIP SENSOR

(71) Applicant: Samsung Electronics Co., Ltd, Gyeonggi-do (KR)

(72) Inventors: Jun-Seok Lee, Gyeonggi-do (KR); Jae-Sung Shim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/682,658

(22) Filed: Nov. 20, 2012

(65) Prior Publication Data

US 2013/0159931 A1    Jun. 20, 2013

(30) Foreign Application Priority Data

Dec. 15, 2011   (KR) .......................... 10-2011-0135226

(51) Int. Cl.
  *G06F 3/0482*   (2013.01)
  *G06F 3/0481*   (2013.01)
  *G06F 1/16*     (2006.01)

(52) U.S. Cl.
  CPC .......... *G06F 3/04817* (2013.01); *G06F 1/1671* (2013.01); *G06F 3/0481* (2013.01); *G06F 3/0482* (2013.01)

(58) Field of Classification Search
  CPC combination set(s) only.
  See application file for complete search history.

(56) References Cited

U.S. PATENT DOCUMENTS

| | | | |
|---|---|---|---|
| 5,287,514 A | | 2/1994 | Gram |
| 6,268,857 B1 * | | 7/2001 | Fishkin et al. ................ 715/863 |
| 6,413,233 B1 * | | 7/2002 | Sites et al. .................... 604/6.13 |
| 6,573,883 B1 * | | 6/2003 | Bartlett ......................... 345/156 |
| 7,145,552 B2 * | | 12/2006 | Hollingsworth ............. 345/168 |
| 7,420,546 B2 * | | 9/2008 | Abdallah et al. ............. 345/173 |
| 7,575,166 B2 * | | 8/2009 | McNamara ................... 235/440 |
| 7,656,393 B2 * | | 2/2010 | King et al. .................... 345/173 |
| 7,800,592 B2 * | | 9/2010 | Kerr et al. .................... 345/173 |
| 7,971,143 B2 * | | 6/2011 | Santanche et al. ............ 715/736 |
| 8,195,220 B2 * | | 6/2012 | Kim et al. ................... 455/550.1 |
| 8,274,407 B2 * | | 9/2012 | Dell'Orto ....................... 341/20 |
| 8,351,993 B2 * | | 1/2013 | Nunes ........................... 455/566 |
| 8,412,158 B2 * | | 4/2013 | Forutanpour et al. ......... 455/411 |
| 2002/0021278 A1 * | | 2/2002 | Hinckley et al. ............. 345/156 |
| 2002/0158838 A1 * | | 10/2002 | Smith et al. .................. 345/156 |
| 2004/0125073 A1 * | | 7/2004 | Potter et al. .................. 345/156 |

(Continued)

FOREIGN PATENT DOCUMENTS

| | | |
|---|---|---|
| CN | 1813462 A | 8/2006 |
| CN | 101256464 A | 9/2008 |

(Continued)

OTHER PUBLICATIONS

Extended European Search Report dated Mar. 27, 2015 in connection with European Patent Application No. 12196729.3; 9 pages.

(Continued)

*Primary Examiner* — Phenuel Salomon

(57) ABSTRACT

User-based control over the operation of a mobile terminal is provided in response to detecting a user's touched position on one or more grip sensors in the mobile terminal. At least one icon set by the user to be displayed in response to detection of at least a predetermined amount of pressure on an actuated grip sensor is displayed depending on the detected touch position.

20 Claims, 8 Drawing Sheets

(56) References Cited

U.S. PATENT DOCUMENTS

| | | |
|---|---|---|
| 2004/0263484 A1 | 12/2004 | Mantysalo et al. |
| 2005/0020306 A1* | 1/2005 | Jin ................................ 455/557 |
| 2007/0040810 A1* | 2/2007 | Dowe et al. ................... 345/173 |
| 2008/0163119 A1* | 7/2008 | Kim et al. ..................... 715/840 |
| 2008/0202823 A1 | 8/2008 | Won et al. |
| 2009/0259969 A1* | 10/2009 | Pallakoff ....................... 715/808 |
| 2009/0303200 A1* | 12/2009 | Grad ............................. 345/173 |
| 2010/0134423 A1* | 6/2010 | Brisebois et al. ............. 345/173 |
| 2011/0012840 A1* | 1/2011 | Hotelling et al. ............. 345/173 |
| 2011/0018827 A1 | 1/2011 | Wang et al. |
| 2011/0148915 A1* | 6/2011 | Kim ................................ 345/619 |
| 2012/0127069 A1* | 5/2012 | Santhiveeran et al. ........ 345/156 |
| 2012/0194336 A1* | 8/2012 | Thiruvengada et al. ...... 340/525 |
| 2012/0324381 A1* | 12/2012 | Cohen et al. .................. 715/765 |
| 2013/0007650 A1* | 1/2013 | Van Hoy et al. .............. 715/771 |
| 2013/0086503 A1* | 4/2013 | Kotowski ...................... 715/773 |
| 2014/0289655 A1 | 9/2014 | Park et al. |

FOREIGN PATENT DOCUMENTS

| | | |
|---|---|---|
| EP | 2175344 A2 | 4/2010 |
| EP | 2280339 A1 | 2/2011 |
| KR | 10-2011-0069476 | 6/2011 |
| WO | WO 2007/103631 A2 | 9/2007 |

OTHER PUBLICATIONS

First Office Action dated Mar. 24, 2015 in connection with Chinese Patent Application No. 1212105415026; 23 pages.

Graff, D.; "How to Customize Button and Multitouch Functionality on Your Jailbroken iOS Device"; LifeHacker.com; Sep. 26, 2011; 3 pages.

\* cited by examiner

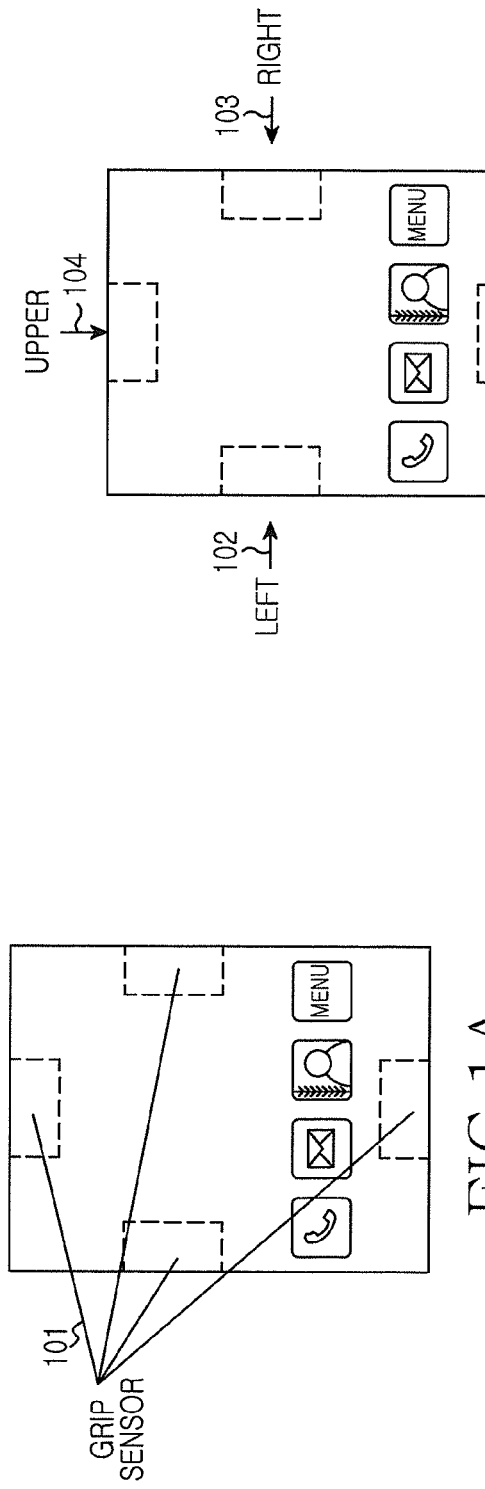
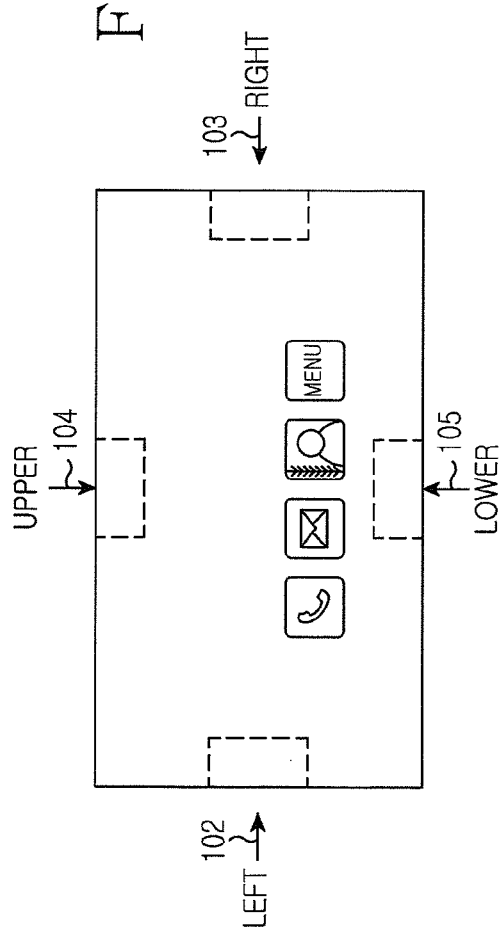
FIG.1A
FIG.1B
FIG.1C

APPARATUS AND METHOD OF USER-BASED MOBILE TERMINAL DISPLAY CONTROL USING GRIP SENSOR

CROSS-REFERENCE TO RELATED APPLICATION(S) AND CLAIM OF PRIORITY

The present application is related to and claims the benefit under 35 U.S.C. §119(a) to a Korean Patent Application filed in the Korean Intellectual Property Office on Dec. 15, 2011 and assigned Serial No. 10-2011-0135226, the entire disclosure of which are hereby incorporated by reference.

TECHNICAL FIELD

The present disclosure relates to control of mobile terminal displays, and in particular user-based control of mobile terminal displays.

BACKGROUND

As information communication technology develops, information accessibility that allows a user to use a mobile terminal conveniently rather than be limited by functions of the mobile terminal emerges as an important issue. For example, an acceleration sensor or a gyro sensor is provided in the mobile terminal to display a screen depending on a position or orientation at which a user holds the mobile terminal, so that user convenience is raised. In addition, a user-oriented user interface that allows a user to manipulate a mobile terminal with one hand even when the user does not touch the mobile terminal with both hands is also under development, so that user convenience improves.

However, the conventional mobile terminal has a limitation in that a User Interface (UI) grouping that displays icons preferred by a user depending on the user's gripping method is not applied. For example, to select and execute an icon preferred by a user among a plurality of icons stored in the mobile terminal, the user must search for an icon of interest one by one among numerous icons.

SUMMARY

To address the above-discussed deficiencies of the prior art, it is a primary object to provide at least the advantages described below. Accordingly, an aspect of the present disclosure is to provide an apparatus and a method for immediately displaying an icon of a user's interest set in advance when the user touches a specific region to improve user convenience by providing a grip sensor to a mobile terminal.

Another object of the present disclosure is to provide an apparatus and a method for allowing a user to manipulate a mobile terminal with only one hand without gripping the mobile terminal with both hands.

Still another object of the present disclosure is to provide an apparatus and a method for raising a user's accessibility by reflecting a user's personality and necessity, not considering mobile terminal orientation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A through 1C are views illustrating a reference with which a position of a grip sensor and a side direction of a mobile terminal are determined according to an exemplary embodiment of the present disclosure;

FIGS. 3A and 2B are views illustrating an embodiment for setting a left grip sensor according to an exemplary embodiment of the present disclosure;

Throughout the drawings, like reference numerals will be understood to refer to like parts, components and structures.

DETAILED DESCRIPTION

Figure 2C:
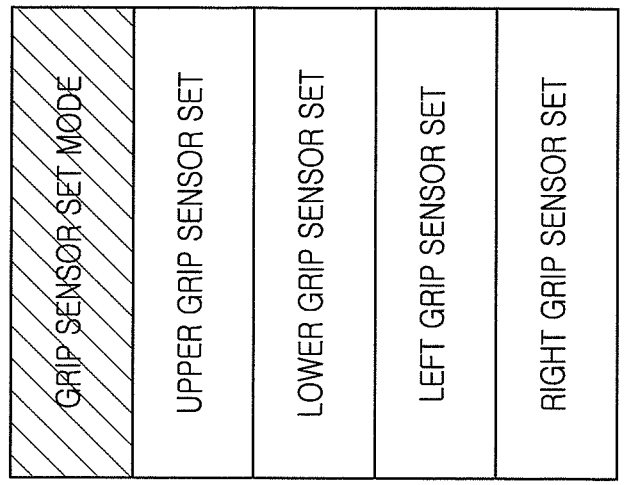
FIGS. 2A through 2C are views illustrating an embodiment for selecting a grip sensor set mode according to an exemplary embodiment of the present disclosure.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. The following description with reference to the accompanying drawings is provided to assist in a comprehensive understanding of exemplary embodiments of the subject matter of the present disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

FIGS. 1A through 1C are views illustrating a reference with which a position of a grip sensor and a side direction of a mobile terminal are determined according to an exemplary embodiment of the present disclosure. First, FIG. 1A illustrates a position of a grip sensor. As illustrated in FIG. 1A, the present disclosure detects a user's touch using the grip sensor 101. Sensor(s) used for the mobile terminal may include any combination of an acceleration sensor, a gyro sensor, a proximity sensor, etc. The mobile terminal according to the present disclosure uses a grip sensor in addition to the above sensors. Here, the grip sensor denotes a sensor that operates when detecting at least a predetermined pressure set by a user, and may be any type of pressure sensor. In a mobile terminal according to the present disclosure, grip sensors 101 are positioned around the peripheral edge of the mobile terminal on the upper side, the lower side, the left side, and the right side when the mobile terminal is viewed in an upright position (i.e., with the display oriented vertically). More specifically, when a user touches the grip sensor 101 provided to the mobile terminal with at least a predetermined pressure, a display control responsive to the sensor is allowed to operate. Though FIG. 1A illustrates the mobile terminal with grip sensors 101 on the upper side, the lower side, the left side, and the right side, respectively as described above, the grip sensor 101 may be positioned anywhere on the upper/lower edges depending on a developer's selection, of course. The present disclosure thus provides an apparatus and a method for allowing a user to immediately display an icon of interest with one hand, and preferably, utilities of the left grip sensor and the right grip sensor are high. A user's gripping position for gripping the mobile terminal may be any point, but it is often inconvenient for a user to grip the upper side or the lower side of the mobile terminal and use the mobile terminal. However, it is preferable that a portion of the grip sensor 101 is positioned at the upper side and the lower side as well as the left side and the right side of the mobile terminal to increase a range of selection grips by which a user makes a selection of an icon to be displayed.

FIGS. 1B and 1C illustrate a reference of determining a side direction of a mobile terminal based on orientation. As illustrated in FIGS. 1B and 1C, the determination the side direction of the mobile terminal is the direction when a user views a screen of the mobile terminal straight. More specifically, an acceleration sensor, a gyro sensor, etc. are attached to a mobile terminal, and a screen of the mobile terminal changes orientation in the case where the user inclines the mobile terminal or rotates the direction of the mobile terminal to the left and right so that a user may view the screen of the mobile terminal upright with a long dimension of the screen either vertical or horizontal. That is, the screen of the mobile terminal is not fixed horizontally or vertically and not displayed constantly, but in the case where a user changes the position of the mobile terminal, the screen of the mobile terminal moves accordingly to improve user convenience. The reference of determining the side direction of the mobile terminal, as described above, is the direction when a user views the screen of the mobile terminal straight without change of left and right, and up and down. Therefore, FIG. 1B illustrates a case where the screen of the mobile terminal is displayed vertically and a reference direction becomes the direction when a user views the screen of the mobile terminal vertically. That is, a left side 102, a right side 103, an upper side 104, and a lower side 105 are determined using the reference direction when the user views the screen of the mobile terminal vertically. FIG. 1C illustrates a case where the screen of the mobile terminal is displayed horizontally and a reference direction becomes the direction when a user views the screen of the mobile terminal horizontally. That is, a left side 102, a right side 103, an upper side 104, and a lower side 105 are determined using the reference direction when the user views the screen of the mobile terminal horizontally.

Figure 2B:
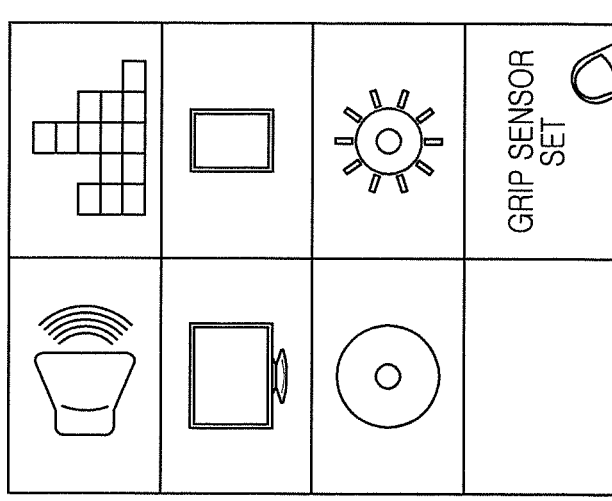
Figure 2A:
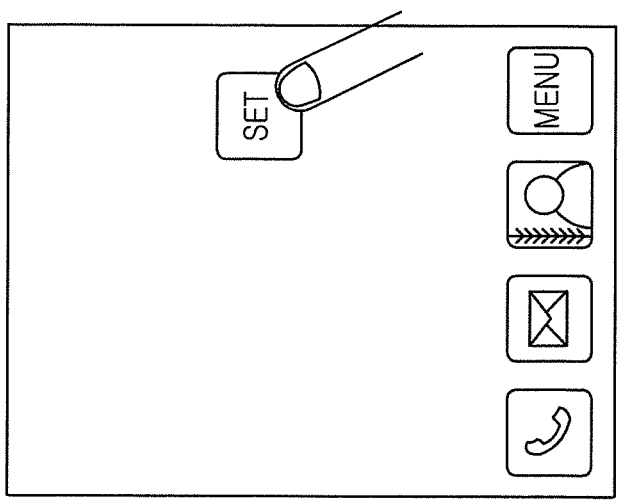

FIGS. 2A through 2C are views illustrating an embodiment for selecting a grip sensor set mode according to an exemplary embodiment of the present disclosure. As illustrated in FIG. 2A, a user selects a set icon displayed on a mobile terminal to enter a step for selecting a grip sensor set mode. Though FIG. 2A illustrates that the user selects the set icon, the user may use an icon of a similar name to the set icon or a shortcut key when the user does not necessarily select the set icon.

When the user selects the set icon of the mobile terminal, the user then selects a grip sensor set icon in the next step as illustrated in FIG. 2B. More specifically, when a set icon is selected by a user, the mobile terminal displays detailed set icons of various menus. For example, the mobile terminal displays various detailed set icons so that a user may select a sound, a volume, a screen, a control, etc. The user selects a grip sensor set icon among a plurality of detailed set icons in order to enter a grip sensor set mode.

When the grip sensor set icon is selected by the user, the mobile terminal displays a grip sensor set mode as illustrated in FIG. 2C. More specifically, as a pre-step for setting a grip sensor, a list of a plurality of grip sensor set modes are displayed. For example, as illustrated in FIG. 2C, as a grip sensor set mode, a list of an upper grip sensor set mode, a lower grip sensor set mode, a left grip sensor set mode, and a right grip sensor set mode is displayed. Here, the upper grip sensor set mode is selected for setting to use a grip sensor provided to the upper side of the mobile terminal. When the mobile terminal detects at least a predetermined pressure applied by a user, an icon selected by the user in advance is displayed on a screen of the mobile terminal. Similarly, the lower grip sensor set mode, the left grip sensor set mode, and the right grip sensor set mode are selected for setting to use grip sensors provided to the lower side, the left side, and the right side of the mobile terminal, respectively. When the mobile terminal detects at least a predetermined pressure applied by the user, an icon selected by the user in advance is displayed on the screen of the mobile terminal.

Figure 3A:
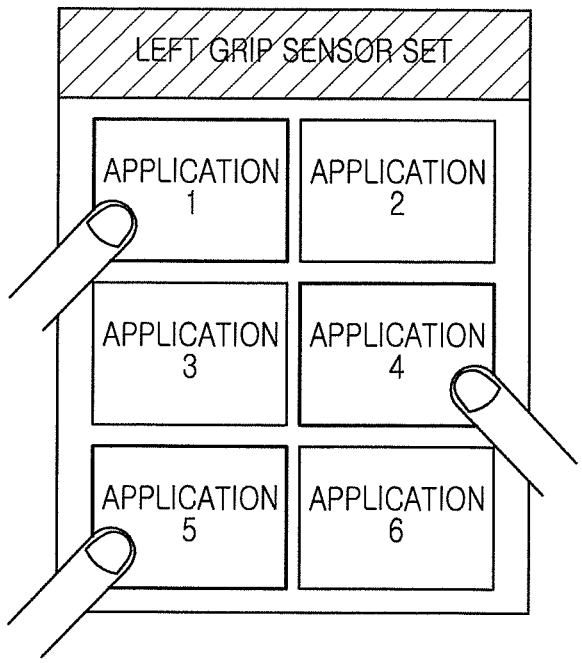
Figure 3B:
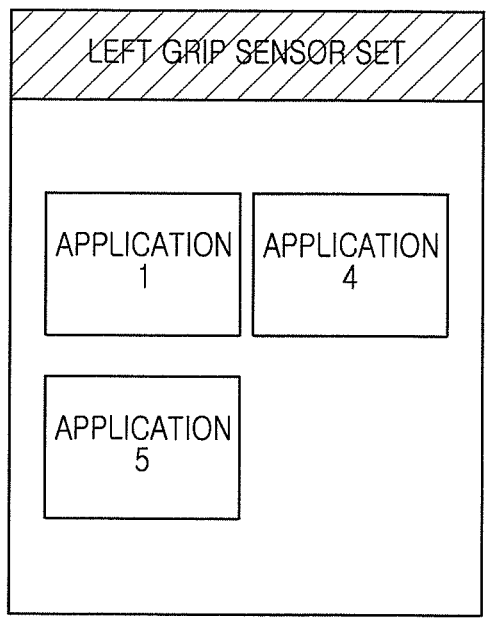

FIGS. 3A and 3B are views illustrating an embodiment for setting a left grip sensor according to an exemplary embodiment of the present disclosure. As illustrated in FIG. 3A, a user selects at least one specific icon stored in the mobile terminal in order to set the left grip sensor. More specifically, as described in more detail with reference to FIGS. 2A-2C, as a pre-step for setting a left grip sensor, the user selects the left grip sensor set mode from among one or more grip sensor set modes included in the grip sensor set mode list. That is, when the user selects the left grip sensor set mode from among one or more grip sensor set modes included in the grip sensor set list in order to set the left grip sensor, specific icons stored in the mobile terminal in advance are displayed as illustrated in FIG. 3A. After that, the user may select a specific icon in which the user is interested or which is frequently used by the user. Preferably, it is convenient for a user to set a grip sensor for each category. For example, in the case where the user is usually interested in games and so frequently executes a game-related application, the user may set a game application as one category when setting the left grip sensor. That is, in the case where the user later displays an application set to the left grip sensor, the user can conveniently view the game-related application frequently executed by the user on one screen among items in which the user is interested.

When the user selects at least one icon to be stored in the left grip sensor set mode, the mobile terminal displays a left grip sensor list selected by the user as illustrated in FIG. 3B, so that the user may determine an icon selected by the user again to modify and add the icon. As exemplarily illustrated in FIG. 3B, an application 1, an application 4, and an application 5 selected by the user among a plurality of applications stored in the mobile terminal may be viewed via the left grip sensor list.

Figure 4A:
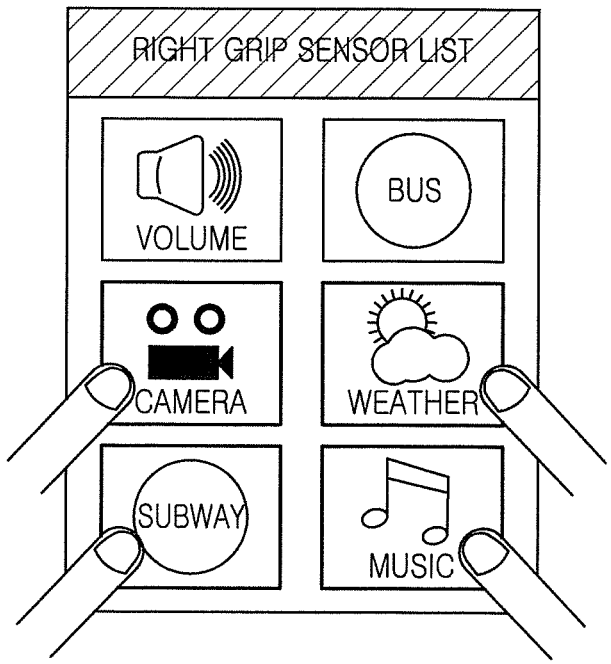
FIGS. 4A and 4B are views illustrating an embodiment for setting a right grip sensor according to an exemplary embodiment of the present disclosure.
Figure 4B:
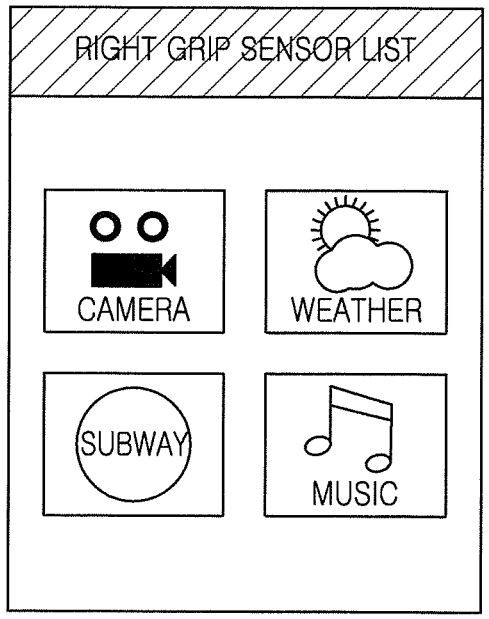

FIGS. 4A and 4B are views illustrating an embodiment for setting a right grip sensor according to an exemplary embodiment of the present disclosure. As illustrated in FIG. 4A, a user selects at least one specific icon stored in the mobile terminal in order to set the right grip sensor. More specifically, as described in more detail with reference to FIGS. 2A-2C, as a pre-step for setting the right grip sensor, the user selects a right grip sensor set list from among one or more grip sensor set modes included in the grip sensor set mode list. That is, when the user selects a right grip sensor set list from among one or more grip sensor set modes included in the grip sensor set mode list in order to set the right grip sensor, specific icons stored in the mobile terminal in advance are displayed as illustrated in FIG. 4A. After that, the user may select a specific icon in which the user is interested or which is frequently used by the user. As exemplarily illustrated in FIG. 4A, when the user selects the right grip sensor set list in a list displayed in the grip sensor set mode in order to set the right grip sensor, specific icons stored in the mobile terminal in advance are displayed on the screen of the mobile terminal. When the user frequently takes a photograph using the mobile terminal, has an occupation much influenced by weather and so frequently searches for a weather-related application, frequently uses public transportation, or enjoys listening music while on the move, the user may select a camera-related application, a weather-related application, a subway-related application, and/or a music-related application. In connection with the above-described right grip sensor, it is preferable to select the rest of the applications of interest from among applications not stored in the left grip sensor set, with consideration of fields in which the user is usually interested.

When the user selects at least one application to be stored in the right grip sensor set, the mobile terminal displays a right grip sensor list selected by the user as illustrated in FIG. 4B, so that the user may determine an application selected by the user again to modify and add an icon. As exemplarily illustrated in FIG. 4B, the user may view a camera icon, a weather application, a subway application, and a music application selected by the user among a plurality of icons stored in the mobile terminal via the right grip sensor list. As described in more detail with reference to FIGS. 3A-3B, according to the present disclosure, it is more efficient to set the left grip sensor and the right grip sensor because it is convenient that the user grips the left side and/or the right side of the mobile terminal in order to easily grip the mobile terminal with one hand. In the case where the user has lots of items of interest, it is also possible to set the upper grip sensor and the lower grip sensor.

Figure 5A:
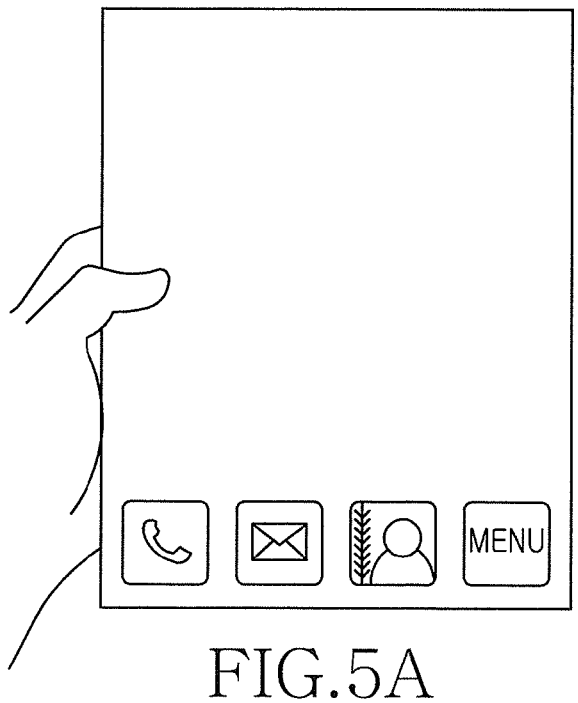
FIGS. 5A through 5D are views illustrating an embodiment where set icons are displayed depending on a direction in which a user grips a mobile terminal according to an exemplary embodiment of the present disclosure.
Figure 5B:
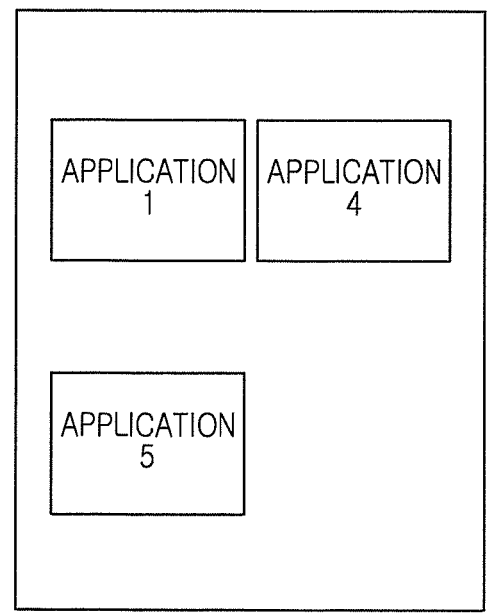

FIGS. 5A through 5D are views illustrating an embodiment where set icons are displayed depending on a direction in which a user grips a mobile terminal according to an exemplary embodiment of the present disclosure. First, FIGS. 5A and 5B illustrate that icons set in advance are displayed in the case where a user grips the left side of the mobile terminal. As illustrated in FIGS. 5A and 5B, in the case where the user grips the left side of the mobile terminal, icons for an application 1, an application 4, and an application 5, which are icons set by the user in advance, are displayed on the screen of the mobile terminal. More specifically, conventionally, to execute a specific application, the user should select a menu on a main screen of the mobile terminal, search for an application desired by the user one by one among the icons for various applications, and then select the icon for the desired application. Therefore, it does not take much time to execute a specific icon stored in the mobile terminal, but the user must manually locate and select an icon of interest. In contrast, according to the present disclosure, when the user grips one side of the mobile terminal with one hand, without searching for icons of interest, a grip sensor provided to the mobile terminal operates and icons of interest set in advance for the actuated grip sensor are displayed on the screen of the mobile terminal. Therefore, the user may immediately select and execute an icon of interest, so that the user's convenience improves.

Figure 5C:
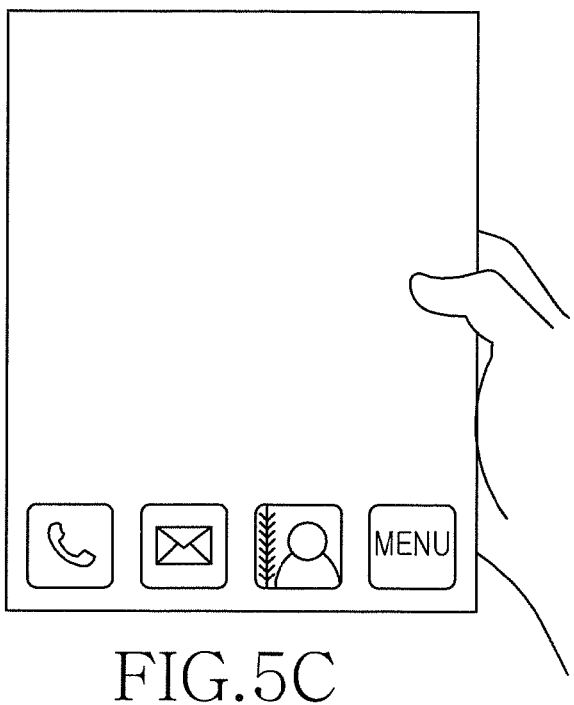
Figure 5D:
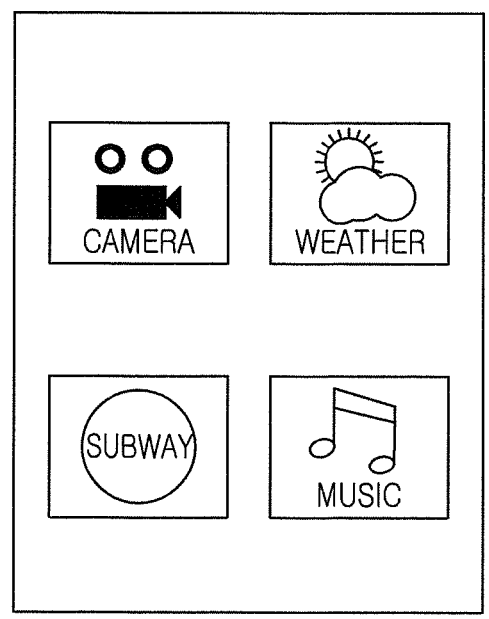

FIGS. 5C and 5D illustrate that in the case where a user grips the right side of the mobile terminal, icons set in advance are displayed. As illustrated in FIGS. 5C and 5D, in the case where the user grips the right side of the mobile terminal, icons for a camera application, a weather application, a subway application, and a music application, which are icons set by the user in advance, are displayed on the screen of the mobile terminal. More specifically, in the case where a grip sensor provided to the right side of the mobile terminal detects the user's touch to sense a pressure set in advance or more, icons set in advance are displayed on the screen of the mobile terminal. Therefore, the user may immediately select and execute an icon of interest, so that the user's convenience improves.

Preferably, when a user who predominantly uses a right hand to hold the mobile terminal stores an application of interest of a highest rank in setting a left grip sensor, convenience improves. Likewise, a user who predominantly uses a left hand to hold the mobile terminal may improve convenience by storing an application of interest of a highest rank when setting a right grip sensor. Though FIGS. 5A-5D illustrate an embodiment of using a grip sensor on the left side and the right side of the mobile terminal, the grip sensor may be provided to the upper side and the lower side, or edges, and operated in like manner.

Figure 6C:
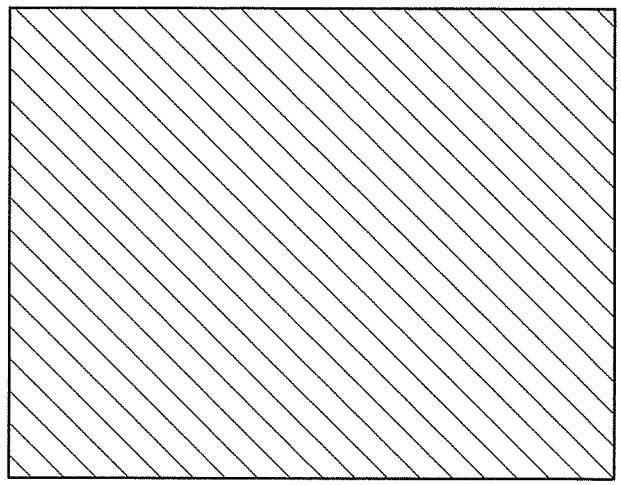
FIGS. 6A through 6C are views illustrating an embodiment where a grip sensor does not operate according to an exemplary embodiment of the present disclosure.
Figure 6B:
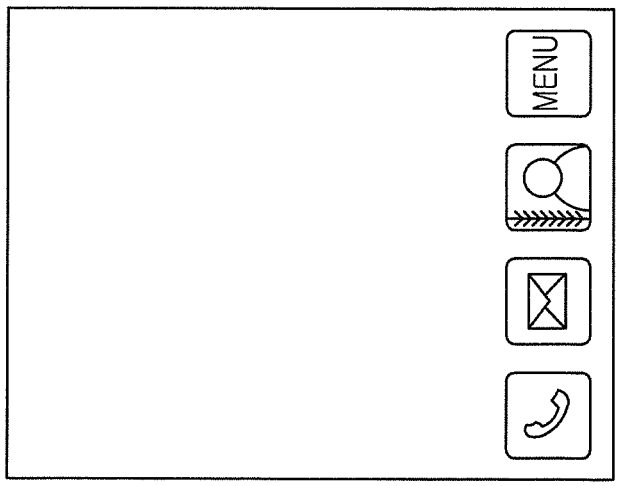
Figure 6A:
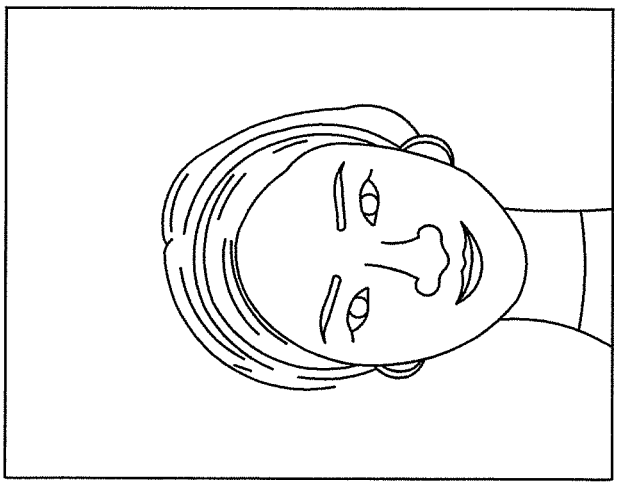

FIGS. 6A through 6C are views illustrating an embodiment where a grip sensor does not operate according to an exemplary embodiment of the present disclosure. First, as illustrated in FIG. 6A, for example, in the case where a user executes a movie application using the mobile terminal and a specific moving picture is being displayed on a display unit of the mobile terminal, the grip sensor provided to the mobile terminal does not operate. More specifically, when the grip sensor is allowed to operate even when a specific moving picture is being played, when the user touches the grip sensor of a predetermined direction while watching a movie, the moving picture that is being displayed may stop. That is, when the grip sensor is allowed to always operate, a spirit of the disclosure proposed for improving the user's convenience may be useless. Therefore, in the case where the mobile terminal is displaying a specific moving picture or a specific application, operation of the grip sensor may be temporarily disabled, and after the application executed by the user ends, the grip sensor operates again as described above.

FIG. 6B illustrates another embodiment where a grip sensor does not operate, in which at least two grip sensors provided to the mobile terminal receives the same pressure. More specifically, since the grip sensor is not a sensor that detects a user's skin to operate when detecting a predetermined pressure or more, the grip sensor may be operated by other external forces. That is, this constraint is for preventing the grip sensor from being operated even when the user does not want the grip sensor to operate. Therefore, as illustrated in FIG. 6B, in the case where a constant pressure is applied to a plurality of grip sensors, the grip sensors do not operate. For example, in the case where the mobile terminal having the grip sensor is put on a flat place, the plurality of grip sensors detect the same pressure, so that icons set in advance are not displayed on the screen of the mobile terminal.

FIG. 6C illustrates another embodiment to which a grip sensor is not applied, where a mobile terminal is in a sleep mode. More specifically, when at least one grip sensor provided to the mobile terminal operates even in the sleep mode, this operation is undesirable since the power of the battery of the mobile terminal is rapidly consumed. Therefore, the grip sensor does not operate in the sleep mode.

Figure 7:
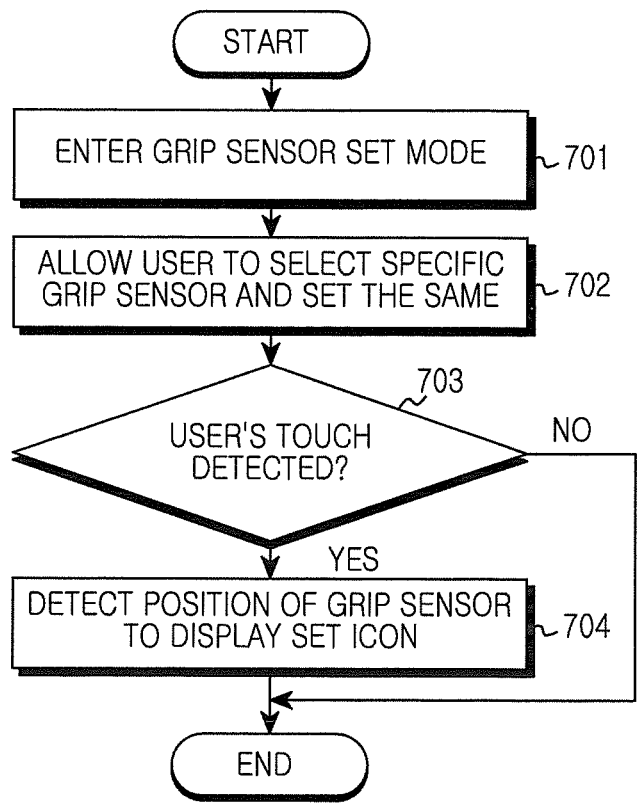
FIG. 7 is a flowchart illustrating a sequence of operating a grip sensor according to an exemplary embodiment of the present disclosure.

FIG. 7 is a flowchart illustrating a sequence of operating a grip sensor according to an exemplary embodiment of the present disclosure. As illustrated in FIG. 7, first, a mobile terminal enters a grip sensor set mode via a user's selection (step 701). More specifically, the mobile terminal allows the user to select a set icon on a main screen of the mobile terminal. After that, when a plurality of set icons are displayed, the mobile terminal allows the user to select a grip sensor set menu. When allowing the user to select the grip sensor set menu, the mobile terminal displays a detailed set list on a display unit. For example, the mobile terminal displays an upper grip sensor set, a lower grip sensor set, a left grip sensor set, and a right grip sensor set.

When entering the grip sensor set mode to display at least one set mode, the mobile terminal allows the user to select and set a specific grip sensor (step 702). More specifically, the mobile terminal allows the user to input one of the upper grip sensor set, the lower grip sensor set, the left grip sensor set, and the right grip sensor set. For example, when the mobile terminal receives the left grip sensor set from the user, the mobile terminal displays an icon stored in advance on a display unit. After that, the mobile terminal allows the user to select at least one icon of interest and displays a left grip sensor list including icons of interest. Therefore, the user may add or delete a specific icon while viewing the icons included in the left grip sensor list.

When the specific grip sensor is set by the user, the mobile terminal determines whether it has detected the user's touch (step 703). More specifically, in the case where a grip sensor module is set by the user and then the user touches the specific grip sensor set in advance with a predetermined pressure or more, the grip sensor of the mobile terminal detects this pressure. That is, the grip sensor provided to at least one of the upper side, the lower side, the left side, and the right side of the mobile terminal detects the user's touch. Therefore, in an aspect of the user, the user may execute the specific icon of the mobile terminal even without using both hands, and does not need to search for an icon list of the mobile terminal one by one in order to execute an icon of interest.

When detecting the user's touch, the mobile terminal detects the position of the grip sensor to display a set icon (step 704). More specifically, as described above, when the grip sensor operates to detect the user's touch, an icon set in advance is immediately displayed on the screen of the mobile terminal. For example, in the case where the user sets the left grip sensor to store a game application, when the user touches the left side on which the left grip sensor is positioned with a predetermined pressure or more afterward, the mobile terminal detects the user's touch position to display the game application set in advance on the display unit of the mobile terminal. Likewise, in the case where the user sets a traffic application frequently usually executed to the right grip sensor and stores the same, when the user touches the right side on which the right grip sensor is positioned with a predetermined pressure or more afterward, the mobile terminal detects the user's touch position to display the traffic application set in advance on the display unit of the mobile terminal. When the mobile terminal does not detect the user's touch, the grip sensor set in advance does not operate, of course.

Figure 8:
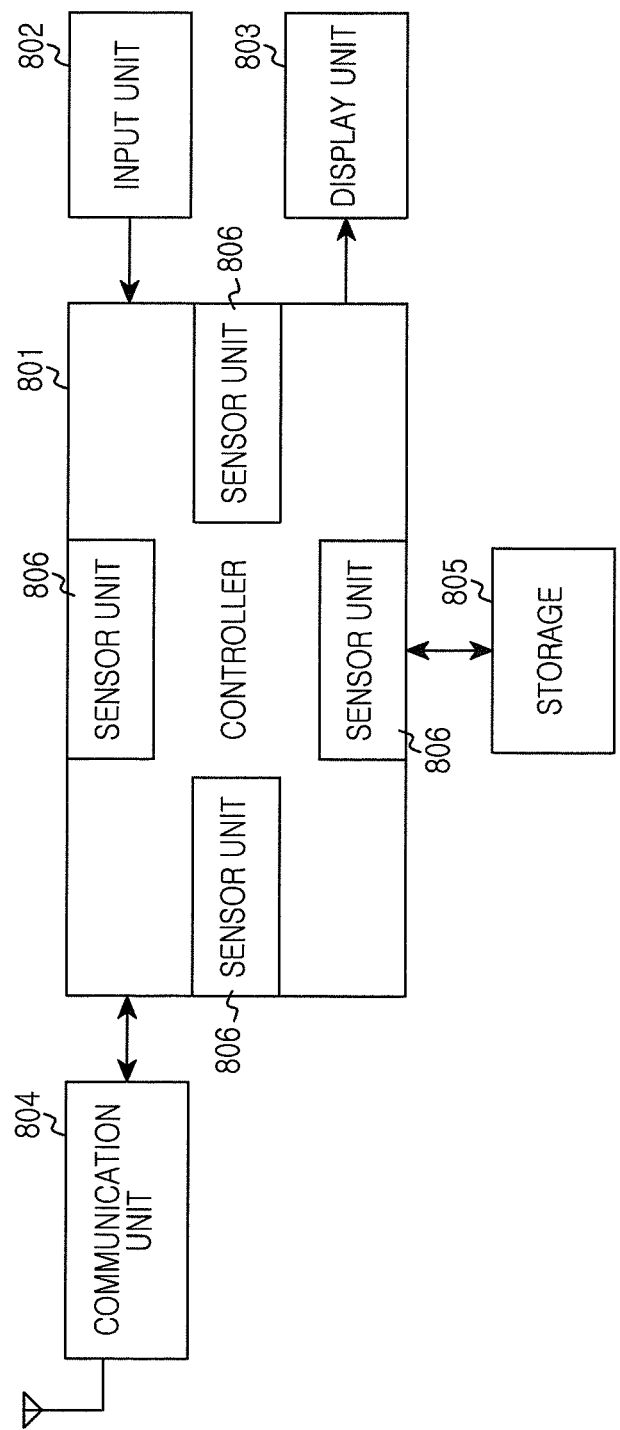
FIG. 8 is a block diagram illustrating a mobile terminal according to an exemplary embodiment of the present disclosure.

FIG. 8 is a block diagram illustrating a mobile terminal according to an exemplary embodiment of the present disclosure. As illustrated in FIG. 8, the mobile terminal may include a controller 801, an input unit 802, a display unit 803, a communication module 804, storage 805, and a sensor unit 806.

The controller 801 controls an overall operation of the mobile terminal. For example, the controller 801 detects a user's touch position, sets the upper side, the lower side, the left side, and the right side using a direction in which the screen of the mobile terminal is displayed straight as a reference depending on a space position or orientation on which the mobile terminal is gripped, and determines a touch detected position using a set direction as a reference. In addition, the controller 801 determines the touch detected position to load a stored icon list depending on a position, and determines the loaded icon list.

The input unit 802 provides input data generated by the user's selection to the controller 801. For example, the input unit 802 allows a user to select at least one list among a plurality of lists included in the sensor set mode, and allows the user to select at least one icon to be stored in the selected list among icons stored in the mobile terminal.

The display unit 803 displays status information, a menu screen, and storage information of the mobile terminal under control of the controller 801. For example, the display unit 803 displays at least one icon set by the user depending on a touch detected position. In addition, the display unit 803 receives a command for starting setting of a sensor to display a sensor set mode.

A touch sensitive display, called as a touch screen, may be used as the display unit 803. In this situation, a touch input may be performed via the touch sensitive display.

For voice and data communication, the communication module 804 processes a signal transmitted/received via an antenna.

The storage 805 may include a program storage for storing a program for controlling an operation of the mobile terminal, and a data storage for storing data occurring during execution of a program. For example, the storage 805 incorporates at least one selected icon into the selected list and stores the same.

At least one sensor unit 806 is provided to the mobile terminal to detect the user's touched position. The sensor unit 806 is a grip sensor provided to at least one of the upper side, the lower side, the left side, and the right side, and operating when detecting a predetermined pressure or more.

In the described block configuration, the controller 801 may perform an overall function of the mobile terminal. Separate configuration and illustration of the controller 801 in an exemplary embodiment of the present disclosure is for separately describing each function. Therefore, in actual realization of a product, all or some of the functions of the mobile terminal may be processed by the controller 801.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the present disclosure should not be limited to the above-described embodiments but should be determined by not only the appended claims but also the equivalents thereof.

What is claimed is:

1. A method to operate a mobile terminal, the method comprising:
   receiving a command to set the one or more sensors to display a sensor set mode;
   permitting a selection of at least one list of a plurality of lists included in the sensor set mode;
   permitting a selection of at least one icon to be stored in at least one selected list among icons stored in the mobile terminal;
   incorporating at least one selected icon into the at least one selected list;
   detecting a position of a touch input using one or more sensors of the mobile terminal, wherein the one or more sensors are located at one or more first locations; and
   displaying on a screen of the mobile terminal at least one previously set icon in response to detecting the position of the touch input using the one or more sensors, wherein the at least one previously set icon is located at a second location different from the one or more first locations and is previously set to be associated with the one or more sensors, wherein displaying the at least one previously set icon in response to detecting the position of the touch input comprises loading a stored icon list that corresponds to the detected position of the touch input, and wherein the stored icon list comprises the at least one previously set icon.

2. The method of claim 1, wherein one sensor of the one or more sensors is provided on at least one of an upper side, a lower side, a left side, and a right side of the mobile terminal.

3. The method of claim 1, further comprising:
   assigning a label to at least one sensor of the one or more sensors of the mobile terminal as a function of an orientation of the mobile terminal, wherein the label comprises at least one of an upper side, a lower side, a left side, and a right side; and
   determining the position of the touch input using the label.

4. The method of claim 3, further comprising:
   changing the label of the at least one sensor of the one or more sensors of the mobile terminal to a different label as a function of a change in orientation of the mobile terminal, wherein the different label comprises the upper side, the lower side, the left side, and the right side; and
   determining the position of the detected touch using the different label.

5. The method of claim 1, wherein the lists comprise an upper grip sensor set list, a lower grip sensor set list, a left grip sensor set list, and a right grip sensor set list.

6. The method of claim 1, wherein the one or more sensors comprise a grip sensor that operates when detecting a pressure at or above a predetermined pressure.

7. The method of claim 1, wherein the at least one icon allows the user to select at least one of a sound, a volume, a screen, or a control.

8. An apparatus of a mobile terminal, the apparatus comprising:
   a controller configured to detect a position of a touch input using one or more sensors of the mobile terminal, wherein the one or more sensors are located at one of more first locations; and
   a display unit configured to display on a screen of the mobile terminal at least one previously set icon in response to detecting the position of the touch input, wherein the at least one previously set icon located at a second location different from the one or more first locations and is previously set to be associated with the one or more sensors,
   wherein the controller is configured to load a stored icon list that corresponds to the detected position of the touch input, wherein the stored icon list comprises the at least one previously set icon, and wherein the display unit is configured to receive a command to set the one or more sensors to display a sensor set mode;
   an input unit configured to permit a selection of at least one list of a plurality of lists included in the sensor set mode, and to permit a selection of at least one icon to be stored in at least one selected list among icons stored in the mobile terminal; and
   a storage configured to incorporate at least one selected icon into the at least one selected list.

9. The apparatus of claim 8, wherein the one or more sensors are located on at least one of an upper side, a lower side, a left side, and a right side of the mobile terminal, and wherein the one or more sensors comprise a grip sensor configured to detect a grip pressure that is greater than set grip pressure.

10. The apparatus of claim 8, wherein the controller is configured to assign a label to at least one sensor of the one or more sensors of the mobile terminal as a function of an orientation of the mobile terminal, wherein the label comprises at least one of an upper side, a lower side, a left side, and a right side, and to determine the position of the touch input using the label.

11. The apparatus of claim 10, wherein the controller is configured to:
- change the label of the at least one sensor of the one or more sensors of the mobile terminal to a different label as a function of a change in orientation of the mobile terminal, wherein the different label comprises the upper side, the lower side, the left side, and the right side; and
- determine the position of the detected touch using the different label.

12. The apparatus of claim 8, wherein the lists comprise an upper grip sensor set list, a lower grip sensor set list, a left grip sensor set list, and a right grip sensor set list.

13. The apparatus of claim 8, wherein the one or more sensors comprise a grip sensor that is configured to operate when detecting at least a set pressure.

14. The apparatus of claim 8, wherein the at least one icon allows the user to select at least one of a sound, a volume, a screen, or a control.

15. A mobile terminal, comprising:
- a display screen;
- one or more grip sensors; and
- a controller configured to:
  - receive a command to set the one or more sensors to display a sensor set mode,
  - permit a selection of at least one list of a plurality of lists included in the sensor set mode,
  - permit a selection of at least one icon to be stored in at least one selected list among icons stored in the mobile terminal,
  - incorporate at least one selected icon into the at least one selected list, and
  - display at least one previously set icon on the display screen in response to detecting a pressure of at least a predetermined amount of pressure on one grip sensor of the one or more grip sensors located at one or more first locations, wherein the at least one previously set icon is located at a second location different from the one or more first locations and is previously set to be associated with the one or more sensors,
- wherein the controller is configured to load a stored icon list that corresponds to a grip sensor position of the one grip sensor when the pressure is detected, wherein the stored icon list comprises the at least one previously set icon.

16. The mobile terminal of claim 15, further comprising:
- a storage configured to store one or more lists of icons associated with the one or more grip sensors, each list including one or more icons to be displayed on the display screen in response to detecting at least the predetermined amount of pressure on a respective grip sensor of the one or more grip sensors.

17. The mobile terminal of claim 16, wherein at least one of the one or more lists includes user-selected icons.

18. The mobile terminal of claim 16, wherein the one or more lists comprise multiple lists and at least two of the multiple lists include different sets of icons.

19. The mobile terminal of claim 15, wherein the lists comprise an upper grip sensor set list, a lower grip sensor set list, a left grip sensor set list, and a right grip sensor set list.

20. The mobile terminal of claim 15, wherein the one or more sensors comprise a grip sensor that is configured to operate when detecting at least a set pressure.

* * * * *